(12) United States Patent
Wu et al.

(10) Patent No.: US 12,117,905 B2
(45) Date of Patent: Oct. 15, 2024

(54) METHOD AND SYSTEM FOR PERFORMING CHECK RECOVERY BASED ON GAUSSIAN ELIMINATION, DEVICE, AND MEDIUM

(71) Applicant: INSPUR SUZHOU INTELLIGENT TECHNOLOGY CO., LTD., Jiangsu (CN)

(72) Inventors: Ruizhen Wu, Shandong (CN); Mingming Wang, Shandong (CN); Lin Wang, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/044,885

(22) PCT Filed: Sep. 29, 2021

(86) PCT No.: PCT/CN2021/121877
§ 371 (c)(1),
(2) Date: Mar. 10, 2023

(87) PCT Pub. No.: WO2022/127289
PCT Pub. Date: Jun. 23, 2022

(65) Prior Publication Data
US 2023/0350759 A1  Nov. 2, 2023

(30) Foreign Application Priority Data

Dec. 18, 2020 (CN) .......................... 202011510959.1

(51) Int. Cl.
*G06F 11/14* (2006.01)
*G06F 17/16* (2006.01)

(52) U.S. Cl.
CPC ...... *G06F 11/1448* (2013.01); *G06F 11/1435* (2013.01); *G06F 17/16* (2013.01)

(58) Field of Classification Search
CPC .. G06F 17/16; G06F 11/1448; G06F 11/1435; G06F 11/1076
See application file for complete search history.

(56) References Cited

U.S. PATENT DOCUMENTS

2009/0132851 A1* 5/2009 Pruthi ................. G06F 11/1076
714/E11.071
2014/0212012 A1* 7/2014 Fain .................... G01R 33/485
324/319

(Continued)

FOREIGN PATENT DOCUMENTS

CN  104461781 A  3/2015
CN  107844272 A  3/2018

(Continued)

OTHER PUBLICATIONS

Search report for International application No. PCT/CN2021/121877 mailed on Jan. 6, 2022.

(Continued)

*Primary Examiner* — Matthew M Kim
*Assistant Examiner* — Matthew N Putaraksa
(74) *Attorney, Agent, or Firm* — Dennemeyer & Associates LLC; Victoria Friedman

(57) ABSTRACT

The present disclosure discloses a method and a system for performing check recovery based on Gaussian elimination, a apparatus, and a storage medium. The method includes: a disk array by using normal data blocks and normal check blocks is constructed, a first reference matrix constructed by using coding matrix rows corresponding to the normal data blocks and the normal check blocks is converted into an inverse matrix through Gaussian elimination; it is determined that coding matrix rows corresponding to a predetermined quantity of blocks, and a second reference matrix is constructed by using the coding matrix rows, the abnormal data blocks, and the abnormal check blocks; and the inverse (Continued)

matrix and the second reference matrix are multiplied to obtain a first matrix, the first matrix and the disk array are multiplied to obtain an output matrix, and original data are obtained according to the output matrix.

20 Claims, 4 Drawing Sheets

(56) References Cited

U.S. PATENT DOCUMENTS

2018/0260276 A1   9/2018  Zeng et al.
2021/0124490 A1*  4/2021  Wu .................... G06F 3/0604

FOREIGN PATENT DOCUMENTS

| CN | 108132854 A | 6/2018  |
| CN | 110442535 A | 11/2019 |
| CN | 111625394 A | 9/2020  |
| CN | 111682874 A | 9/2020  |
| CN | 111697976 A | 9/2020  |
| CN | 111858157 A | 10/2020 |
| CN | 111858169 A | 10/2020 |
| CN | 112799875 A | 5/2021  |

OTHER PUBLICATIONS

Search report for Chinese application 202011510959.1 filed on Dec. 18, 2020.

* cited by examiner

METHOD AND SYSTEM FOR PERFORMING CHECK RECOVERY BASED ON GAUSSIAN ELIMINATION, DEVICE, AND MEDIUM

CROSS-REFERENCE TO RELATED DISCLOSURE

This disclosure is based upon and claims priority to Chinese Patent Application No. 202011510959.1, filed on Dec. 18, 2020 and entitled "Method and System for Performing Check Recovery Based on Gaussian Elimination, Apparatus, and Medium", the disclosure of which is hereby incorporated by reference in its entirety.

TECHNICAL FIELD

The present disclosure relates to the field of distributed storage, and in particular, to a method and a system for performing check recovery based on Gaussian elimination, a computer apparatus, and a readable medium.

BACKGROUND

Facing the storage requirements of multiple data, distributed storage has gradually replaced the dominant position of unified storage with its advantages of low cost, good extendibility, and the like, and distributed storage has attracted more and more attention in the aspects of theoretical research and practical disclosure. Distributed storage systems often take cheap disks as storage nodes, and the reliability of each storage node is often not very high. In another aspect, one distributed storage system usually includes multiple nodes. For the reasons such as software and hardware failures and human errors, the system often has a node failure. In order to improve the data reliability of the distributed storage system and ensure that a data collection node can realize the reconstruction of an original file with a high probability, a certain number of redundancies need to be stored additionally on the basis of the storage of the original data, so that the system can still operate normally in the case of that part nodes fail, and the data collection node can still decode and recover the original file. Meanwhile, in order to maintain the reliability of the system, the failed nodes need to be repaired in time. Therefore, it is very important to design a good node repair mechanism.

Erasure code belongs to a forward error correction technology in coding theory. There are multiple types of erasure code. Reed-Solomon Code (RS Code) applied in a distributed environment is common in practical storage systems. The RS Code is related to two parameters k and r. Two positive integers, namely, k and r, are given, and k data blocks are coded into r additional check blocks by the RS Code. A mode of coding r check blocks based on a Vandermonde matrix or a Cauchy matrix is called RS erasure code coded by using Vandermonde matrix or the Cauchy matrix. A core concept of the erasure code is to construct an invertible coding matrix to generate check data. An inverse matrix may recover original data through calculation.

The common inverse matrix of the RS erasure code is calculated by a Gaussian elimination method, which is a general solution and is applicable to an inverse operation of any invertible matrix. However, the disadvantages is that the Gaussian elimination method is not optimized for characteristics of matrix coding, so although the calculation is regular, multiple redundant operations will be introduced. Moreover, only data blocks can be recovered by using Gaussian elimination. In an actual distributed storage environment, a disk that stores the check blocks may also have an error, so the check blocks also need to be recovered in addition to the data blocks. However, under the storage application requirement of massive data, it takes multiple time and temporary storage units to read disk data involved in the calculation.

SUMMARY

In view of this, an objective of embodiments of the present disclosure is to provide a method and a system for performing check recovery based on Gaussian elimination, a computer apparatus, and a computer-readable storage medium, which can respectively perform different operations for recovering data blocks by traditional Gaussian elimination erasure and simultaneously recovering data blocks and check blocks. Under traditional Gaussian elimination, the data blocks can be recovered without adding redundant operations. In a case that the data blocks and the check blocks need to be recovered simultaneously, a final specific output requirement may be output and obtained by adding a special call and a multiplication operation of matrices.

Based on the above objective, one aspect of the embodiments of the present disclosure provides a method for performing check recovery based on Gaussian elimination, comprising: in response to an abnormality of a distributed storage, the number of abnormal data blocks and the number of abnormal check blocks are determined to judge whether there is a check block that needs to be recovered; in response to that there is check block that needs to be recovered, a disk array is constructed by using normal data blocks and normal check blocks, a first reference matrix is constructed by using coding matrix rows corresponding to the normal data blocks and the normal check blocks, and the first reference matrix is converted into an inverse matrix through Gaussian elimination; coding matrix rows corresponding to a predetermined quantity of blocks are determined which are randomly selected from the normal data blocks and the normal check blocks, and a second reference matrix is constructed by using the coding matrix rows, the abnormal data blocks, and the abnormal check blocks; and the inverse matrix and the second reference matrix are multiplied to obtain a first matrix, the first matrix and the disk array are multiplied to obtain an output matrix, and original data of the abnormal data blocks and original data of the abnormal check blocks are obtained according to the output matrix.

In some embodiments, the method further includes that: in response to that there is no check block that needs to be recovered, the disk array is constructed by using the normal data blocks and the normal check blocks, the first reference matrix is constructed by using coding matrix rows corresponding to the normal data blocks and the normal check blocks, and the first reference matrix is converted into an inverse matrix through Gaussian elimination; and the inverse matrix and the disk array are multiplied to obtain the second output matrix, and original data of the abnormal data blocks is obtained according to the second output matrix.

In some embodiments, the step that the number of the abnormal data blocks and the number of the abnormal check blocks are determined to judge whether there is the check block that needs to be recovered includes that: whether a sum of the abnormal data blocks and the abnormal check blocks is less than a first threshold value is judged; and in response to that the sum of the abnormal data blocks and the abnormal check blocks is less than the first threshold value, the number of the abnormal data blocks and the number of the abnormal check blocks are separately determined.

In some embodiments, the operation that the coding matrix rows corresponding to the predetermined quantity of blocks are randomly selected from the normal data blocks and the normal check blocks includes that: the predetermined quantity is determined according to a difference value between the first threshold value and the sum.

Another aspect of the embodiments of the present disclosure further provides a system for performing check recovery based on Gaussian elimination, which includes: a determination module, configured to: in response to an abnormality of a distributed storage, determine the number of abnormal data blocks and the number of abnormal check blocks to judge whether there is a check block that needs to be recovered; a calculation module, configured to: in response to that there is the check block that needs to be recovered, construct a disk array by using normal data blocks and normal check blocks, construct a first reference matrix by using coding matrix rows corresponding to the normal data blocks and the normal check blocks, and convert the first reference matrix into an inverse matrix through Gaussian elimination; a construction module, configured to determine coding matrix rows corresponding to a predetermined quantity of blocks which are randomly selected from the normal data blocks and the normal check blocks, and construct a second reference matrix by using the coding matrix rows, the abnormal data blocks, and the abnormal check blocks; and an execution module, configured to multiply the inverse matrix and the second reference matrix to obtain a first matrix, multiply the first matrix and the disk array to obtain an output matrix, and obtain original data of the abnormal data blocks and original data of the abnormal check blocks according to the output matrix.

In some embodiments, the method further includes a second execution module, configured to: in response to that there is no check block that needs to be recovered, construct the disk array by using the normal data blocks and the normal check blocks, construct the first reference matrix by using coding matrix rows corresponding to the normal data blocks and the normal check blocks, convert the first reference matrix is into an inverse matrix through Gaussian elimination, multiply the inverse matrix and the disk array to obtain the second output matrix, and obtain original data of the abnormal data blocks according to the second output matrix.

In some embodiments, the determination module is configured to: judge whether a sum of the abnormal data blocks and the abnormal check blocks is less than a first threshold value, and in response to that the sum of the abnormal data blocks and the abnormal check blocks is less than the first threshold value, separately determine the number of the abnormal data blocks and the number of the abnormal check blocks.

In some embodiments, the construction module is configured to determine the predetermined quantity according to a difference value between the first threshold value and the sum.

Still another aspect of the embodiments of the present disclosure further provides a computer apparatus, which includes at least one processor and a memory. The memory stores a computer instruction capable of running on the processor; and the instruction implements steps of the abovementioned method when being executed by the processor.

Yet another aspect of the embodiments of the present disclosure further provides a computer-readable storage medium. The computer-readable storage medium stores a computer program that implements steps of the abovementioned method when being executed by a processor.

The present disclosure has the following technical effects that different operations may be respectively performed for recovering data blocks by traditional Gaussian elimination erasure and simultaneously recovering data blocks and check blocks. Under traditional Gaussian elimination, the data blocks can be recovered without adding redundant operations. In a case that the data blocks and the check blocks need to be recovered simultaneously, a final specific output requirement may be output and obtained by adding a special call and a multiplication operation of matrices.

BRIEF DESCRIPTION OF THE DRAWINGS

In order to illustrate the embodiments of the present disclosure or the methods in the related art more clearly, the drawings that need to be used in the description of the embodiments or the related art will be briefly described below. It is apparent that the drawings in the following description are only some embodiments of the present disclosure, and other drawings can be obtained by those skilled in the art according to these drawings without any creative work.

DETAILED DESCRIPTION OF THE EMBODIMENTS

In order to make the purposes, methods, and advantages of the present disclosure clearer, the embodiments of the present disclosure will be further described in detail below with reference to specific embodiments and the drawings.

It is to be noted that, all expressions using "first" and "second" in the embodiments of the present disclosure are for the purpose of distinguishing two non-identical entities with the same name or non-identical parameters. It may be seen that "first" and "second" are only for the convenience of expression, and should not be construed as a limitation to the embodiments of the present disclosure, which are not described one by one thereto in the subsequent embodiments.

Figure 1:
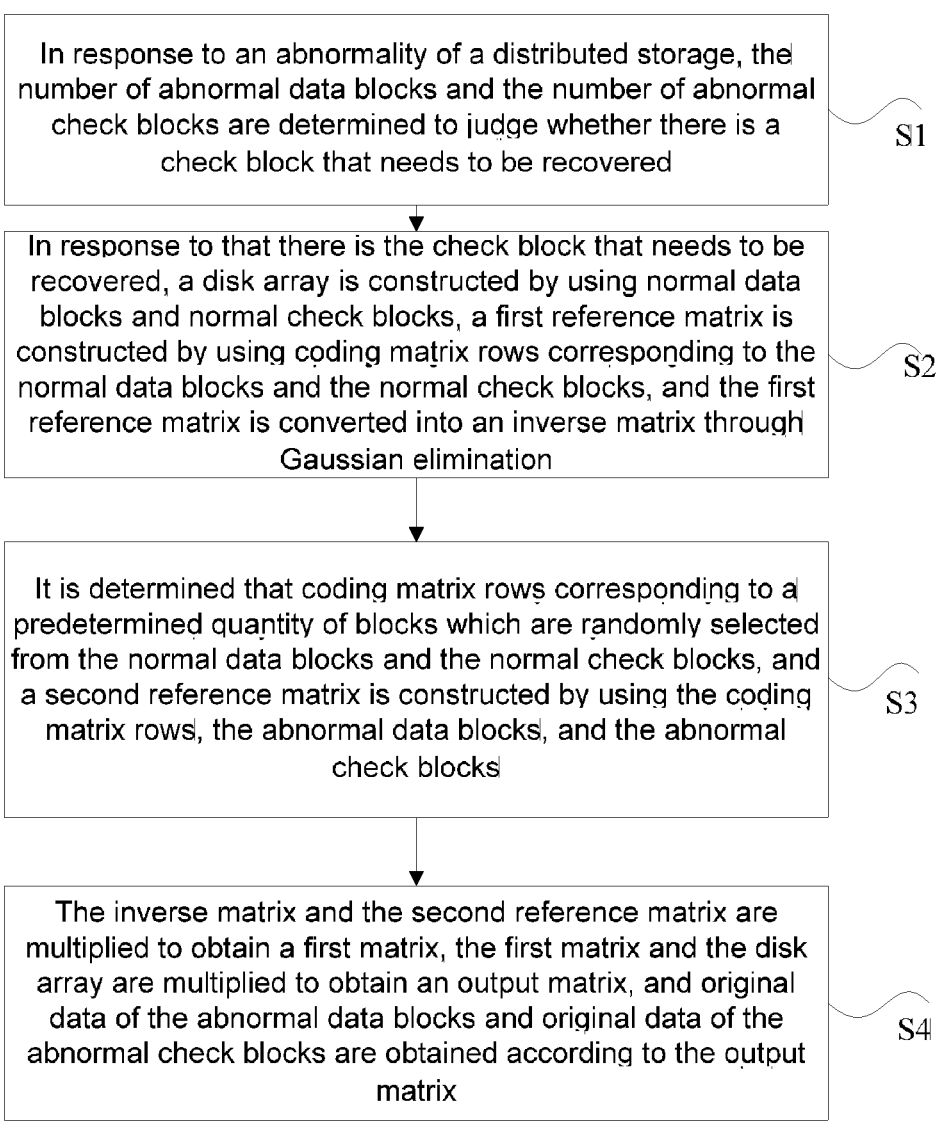
FIG. 1 illustrates a schematic diagram of an embodiment of a method for performing check recovery based on Gaussian elimination provided by the present disclosure.

Based on the above objective, a first aspect of the embodiments of the present disclosure provides an embodiment of a method for performing check recovery based on Gaussian elimination. FIG. 1 illustrates a schematic diagram of an embodiment of a method for performing check recovery based on Gaussian elimination provided by the present disclosure. As shown in FIG. 1, the embodiment of the present disclosure includes the following steps.

At step of S1, in response to an abnormality of a distributed storage, the number of abnormal data blocks and the number of abnormal check blocks are determined to judge whether there is a check block that needs to be recovered.

It should be noted that when there is an abnormal check block, it is determined that there is a check block that needs to be recovered.

At step of S2, in response to that there is the check block that needs to be recovered, a disk array is constructed by using normal data blocks and normal check blocks, a first reference matrix is constructed by using coding matrix rows corresponding to the normal data blocks and the normal check blocks, and the first reference matrix is converted into an inverse matrix through Gaussian elimination.

At step of S3, coding matrix rows corresponding to a predetermined quantity of blocks are randomly selected from the normal data blocks and the normal check blocks, and a second reference matrix is constructed by using the coding matrix rows, the abnormal data blocks, and the abnormal check blocks.

At step of S4, the inverse matrix and the second reference matrix are multiplied to obtain a first matrix, the first matrix and the disk array are multiplied to obtain an output matrix, and original data of the abnormal data blocks and original data of the abnormal check blocks are obtained according to the output matrix.

An RS erasure code based on the Vandermonde matrix is as follows:

$$\begin{bmatrix} 1 & 0 & \cdots & 0 \\ 0 & 1 & \cdots & 0 \\ \vdots & \vdots & \vdots & \vdots \\ 0 & 0 & \cdots & 1 \\ x_1^0 & x_2^0 & \cdots & x_k^0 \\ \vdots & \vdots & \vdots & \vdots \\ x_1^{r-1} & x_2^{r-1} & \cdots & x_k^{r-1} \end{bmatrix} \times \begin{bmatrix} D_1 \\ D_2 \\ \vdots \\ D_k \end{bmatrix} = \begin{bmatrix} D_1 \\ D_2 \\ \vdots \\ D_k \\ P_1 \\ \vdots \\ P_r \end{bmatrix}$$

An RS erasure code based on a Cauchy matrix is as follows:

$$\begin{bmatrix} 1 & 0 & \cdots & 0 \\ 0 & 1 & \cdots & 0 \\ \vdots & \vdots & \vdots & \vdots \\ 0 & 0 & \cdots & 1 \\ \frac{1}{x_1+y_1} & \frac{1}{x_1+y_2} & \cdots & \frac{1}{x_1+y_k} \\ \vdots & \vdots & \vdots & \vdots \\ \frac{1}{x_r+y_1} & \frac{1}{x_r+y_2} & \cdots & \frac{1}{x_r+y_k} \end{bmatrix} \times \begin{bmatrix} D_1 \\ D_2 \\ \vdots \\ D_k \end{bmatrix} = \begin{bmatrix} D_1 \\ D_2 \\ \vdots \\ D_k \\ P_1 \\ \vdots \\ P_r \end{bmatrix}$$

Herein, a k*k matrix at an upper part corresponds to k original data blocks, and r*k matrix at a lower part corresponds to a coding matrix. The coding matrix is multiplied with the original data D1 to Dk to obtain newly added P1 to Pr, which are r check data obtained by coding. When any, at most r, data fails or losses in transmission and needs to be corrected, the original data blocks D1 to Dk will be obtained by multiplying an inverse matrix of a matrix corresponding to remaining data and the data (a derivation process will not be elaborated). A process of an example in which data of D1 to data of Dr loss and are decoded is shown as follows:

$$\begin{bmatrix} \cdots & 1 & \cdots & 0 \\ \cdots & 0 & \cdots & 0 \\ \vdots & \vdots & \vdots & \vdots \\ \cdots & 0 & \cdots & 1 \\ \cdots & x_r^0 & \cdots & x_k^0 \\ \vdots & \vdots & \vdots & \vdots \\ \cdots & x_r^{r-1} & \cdots & x_k^{r-1} \end{bmatrix}^{-1} \times \begin{bmatrix} D_{r+1} \\ D_{r+2} \\ \vdots \\ P_r \end{bmatrix} = \begin{bmatrix} D_1 \\ D_2 \\ \vdots \\ D_k \end{bmatrix} \quad (1)$$

An implementation principle of Gaussian elimination is as follows:

$$[A|E] \xrightarrow{\text{elementary row transformation}} [E|B]$$

For a matrix A that needs to be inversed, a right side is expanded as a unit array E, and then an operation of elementary row transformation is performed on [A|E]: 1, a row is multiplied by or divided by a number; 2, position exchange is performed between rows; and 3, an adding or subtracting operation is performed between the rows. Through elementary row transformation, a [E|B] form on the right side of the above formula may be obtained. At this moment, a matrix B is expanded to obtain an inverse matrix of the matrix A. Then, data blocks $D_1\ D_2\ \ldots\ D_k$ that need to be recovered can be obtained by performing an operation based on the above formula (1).

Embodiments of the present disclosure may be divided into two types that: 1, pure data block recovery; and 2, a check block that needs to be recovered. The pure data block recovery is the basis of a hardware circuit. An example in which there are four data blocks and two check blocks is described. The data blocks are D1, D2, D3, and D4, and the check blocks are P1 and P2. An example is given to the check blocks by using a simple Vandermonde matrix, and the relationship of a coding matrix thereof is as follows:

$$H = \begin{bmatrix} 1 & 0 & 0 & 0 \\ 0 & 1 & 0 & 0 \\ 0 & 0 & 1 & 0 \\ 0 & 0 & 0 & 1 \\ 1 & 1 & 1 & 1 \\ 1 & 2 & 4 & 8 \end{bmatrix} \begin{matrix} --R1 \\ --R2 \\ --R3 \\ --R4 \\ --R5 \\ --R6 \end{matrix}$$

There are six rows in total in a coding matrix H, that is, R1 to R6. R1 to R4 correspond to D1 to D4 unit matrices, and R5 and R6 correspond to check matrices that generate P1 and P2. Therefore, a generation relationship of check blocks P1 and P2 is as follows:

$$\begin{bmatrix} R5 \\ R6 \end{bmatrix} \times \begin{bmatrix} D1 \\ D2 \\ D3 \\ D4 \end{bmatrix} = \begin{bmatrix} 1 & 1 & 1 & 1 \\ 1 & 2 & 4 & 8 \end{bmatrix} \times \begin{bmatrix} D1 \\ D2 \\ D3 \\ D4 \end{bmatrix}$$

$$= \begin{bmatrix} D1 + D2 + D3 + D4 \\ D1 + 2D2 + 4D3 + 8D4 \end{bmatrix}$$

$$= \begin{bmatrix} P1 \\ P2 \end{bmatrix}$$

That is, P1=D1+D2+D3+D4, and P2=D1+2D2+4D3+8D4.

In some embodiments, the step that the number of the abnormal data blocks and the number of the abnormal check blocks are determined to judge whether there is the check block that needs to be recovered includes that: whether a sum of the abnormal data blocks and the abnormal check blocks is less than a first threshold value is judged; and in response to that the sum of the abnormal data blocks and the abnormal check blocks is less than the first threshold value, the number of the abnormal data blocks and the number of the abnormal check blocks are separately determined. The first threshold value may be four. When the sum of the abnormal data blocks and the abnormal check blocks is less than four, then the number of the abnormal data blocks and the number of the abnormal check blocks are separately determined. When the sum of the abnormal data blocks and the abnormal check blocks is not less than four, then the original quantity of the data blocks and the original quantity of the check blocks may be reset.

Figure 2:
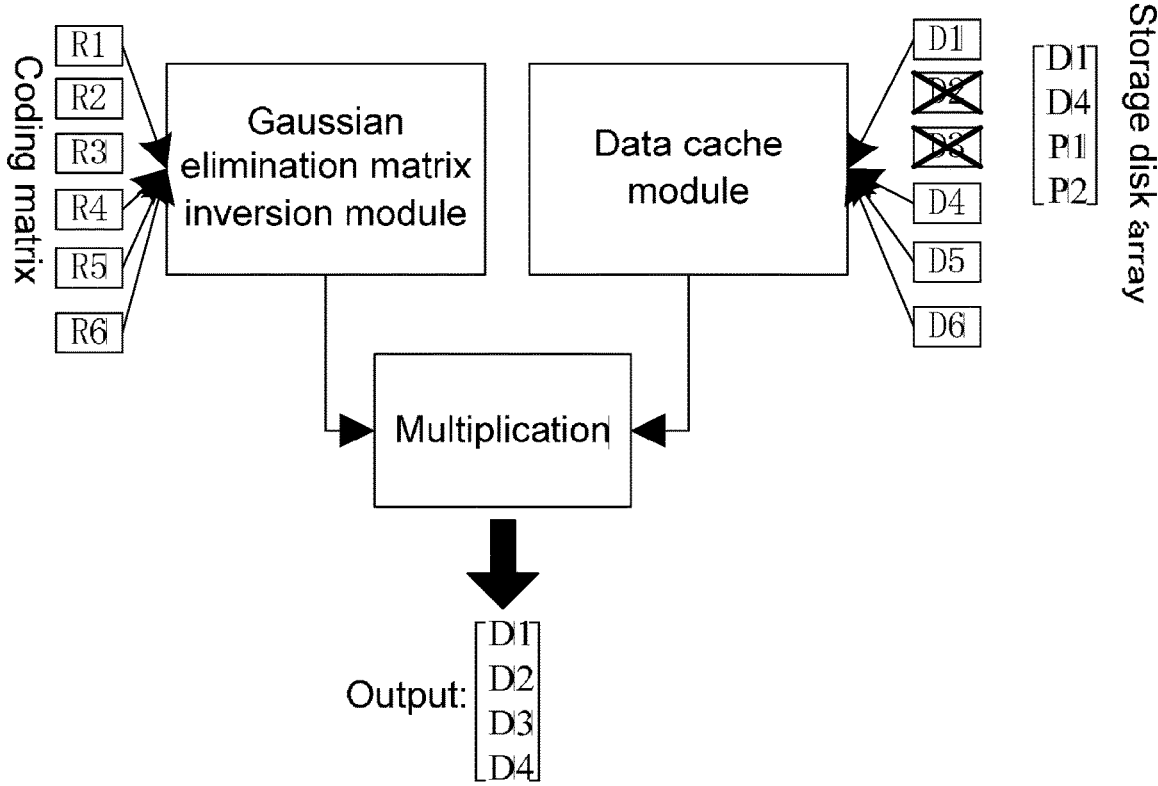
FIG. 2 illustrates a schematic diagram of recovering pure data blocks in an embodiment of the present disclosure.

In some embodiments, the method further includes that: in response to that there is no check block that needs to be recovered, the disk array is constructed by using the normal data blocks and the normal check blocks, the first reference matrix is constructed by using coding matrix rows corresponding to the normal data blocks and the normal check blocks, and the first reference matrix is converted into an inverse matrix through Gaussian elimination; and the inverse matrix and the disk array are multiplied to obtain a second output matrix, and original data of the abnormal data blocks is obtained according to the second output matrix. In an example in which D2 and D3 are damaged and need to be recovered, at this moment, a first part of the present disclosure is called: pure data block recovery. As shown in FIG. 2, a hardware working process is that remaining four survival (correct) disks are selected, namely D1, D4, P1, and P2 herein. The disks are read into a cache module for calculating, and then corresponding matrix determinants are selected to form a matrix. The matrix is input into a Gaussian elimination inverse operation module for inversing, and the matrix selected here is [R1; R4; R5; R6].

At this moment, the calculated output is a data block $$\begin{bmatrix} D1 \\ D2 \\ D3 \\ D4 \end{bmatrix}.$$

When there is a check block that needs to be recovered, it is assumed that D2 and P1 are damaged, at this moment, survival D1, D3, D4, and P2 and corresponding rows thereof are selected first to construct a matrix, and the matrix is input into a hardware module of an operation of a first part in FIG. 2 above. However, a recovery operation after data reading is not performed.

In some embodiments, the operation that the coding matrix rows corresponding to the predetermined quantity of blocks are randomly selected from the normal data blocks and the normal check blocks includes that: the predetermined quantity is determined according to a difference value between the first threshold value and the sum. Coding matrices corresponding to the data blocks and the check blocks are read for the relationship between the data blocks and the check blocks to be recovered actually, and in the example at this moment, R2 and R5 corresponding to D2 and P1 are read. Then, rows corresponding to the any two survival (four coding matrices in total need to be read according to a recovery relationship, and R2 and R5 have been read, so the remaining is 4−2=2) data blocks are randomly selected to form a 4*4 matrix meeting a requirement of recovering the matrix with R2 and R5.

Figure 3:
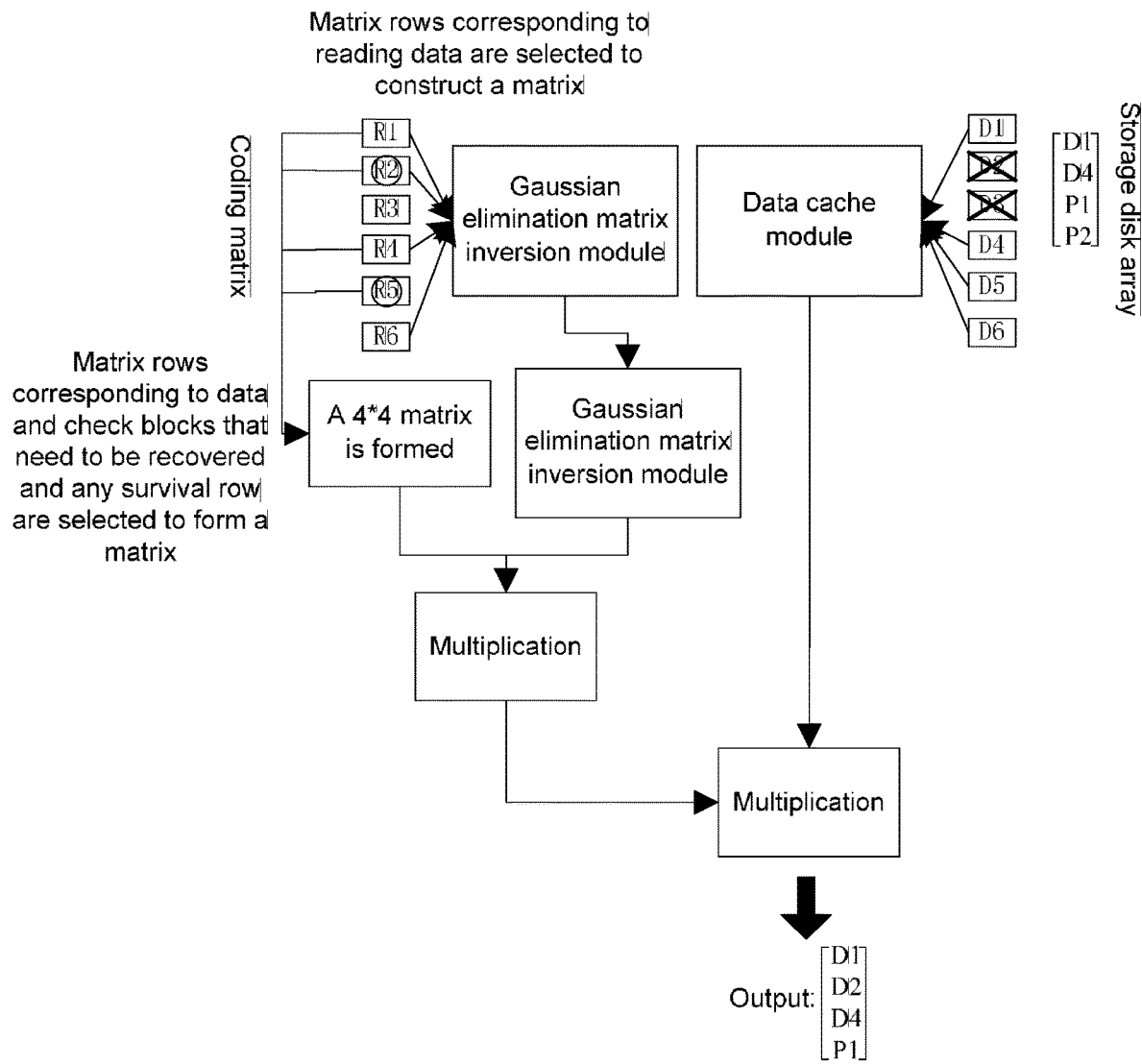
FIG. 3 illustrates a schematic diagram of recovering data blocks and check blocks in an embodiment of the present disclosure.

At this moment, in order to facilitate giving examples, we randomly select R1 and R3. Then, the newly combined matrix and the inverse matrix obtained by Gaussian elimination in the above operation are multiplied, the obtained matrix is substituted into a right matrix of a final multiplication part in FIG. 2, and then the data blocks and the check blocks that need to be recovered can be obtained. The implementation process is as shown in FIG. 3.

A final output $$\begin{bmatrix} D1 \\ D2 \\ D4 \\ P1 \end{bmatrix}$$

can be obtained.

It can be known that the damaged disks are D2 and P1, the recovered output includes the data blocks and the check blocks that need to be recovered, a recovery function is implemented successfully. Moreover, data reading is still $$\begin{bmatrix} D1 \\ D2 \\ D4 \\ P1 \end{bmatrix},$$

and additional data reading does not need to be performed.

Erasure recovery hardware proposed by the present disclosure is improved for the recovery of the check blocks. Erasure data blocks and check blocks are recovered without reading data again. When there is only a data block error, the implementation of a circuit is consistent with related Gaussian elimination. Additional loss cannot be brought. In a special case, for the need of recovery of the check blocks, an output with the check blocks can be obtained by adding special reading of the matrix and a multiplication operation. The method is scheduled flexibly, is applicable to various cases, and can further complete output calculations of different needs in complex cases.

It is to be particularly noted that various steps in various embodiments of the abovementioned method for performing check recovery based on Gaussian elimination may be crossed with, replaced with, added to, or deleted from each other, so that these rational permutation and combination transformations for the method for performing check recovery based on Gaussian elimination should also belong to the scope of protection of the present disclosure, and the scope of protection of the present disclosure should not be limited to the embodiments.

Based on the above objective, a second aspect of the embodiments of the present disclosure provides a system for performing check recovery based on Gaussian elimination, which includes: a determination module, configured to: in response to an abnormality of a distributed storage, determine the number of abnormal data blocks and the number of abnormal check blocks to judge whether there is a check block that needs to be recovered; a calculation module, configured to: in response to that there is the check block that needs to be recovered, construct a disk array by using normal data blocks and normal check blocks, construct a first reference matrix by using coding matrix rows corresponding to the normal data blocks and the normal check blocks, and convert the first reference matrix into an inverse matrix through Gaussian elimination; a construction module, configured to determine coding matrix rows corresponding to a predetermined quantity of blocks which are randomly selected from the normal data blocks and the normal check blocks, and construct a second reference matrix by using the coding matrix rows, the abnormal data blocks, and the abnormal check blocks; and an execution module, configured to multiply the inverse matrix and the second reference matrix to obtain a first matrix, multiply the first matrix and the disk array to obtain an output matrix, and obtain original data of the abnormal data blocks and original data of the abnormal check blocks according to the output matrix.

In some embodiments, the system further includes a second execution module, configured to: in response to that there is no check block that needs to be recovered, construct the disk array by using the normal data blocks and the normal check blocks, construct the first reference matrix by using coding matrix rows corresponding to the normal data blocks and the normal check blocks, convert the first reference matrix into an inverse matrix through Gaussian elimination, multiply the inverse matrix and the disk array to obtain the second output matrix, and obtain original data of the abnormal data blocks according to the second output matrix.

In some embodiments, the determination module is configured to: judge whether a sum of the abnormal data blocks and the abnormal check blocks is less than a first threshold value, and in response to that the sum of the abnormal data blocks and the abnormal check blocks is less than the first threshold value, separately determine the number of the abnormal data blocks and the number of the abnormal check blocks.

In some embodiments, the construction module is configured to determine the predetermined quantity according to a difference value between the first threshold value and the sum.

Based on the above objective, a third aspect of the embodiments of the present disclosure provides a computer apparatus, which includes at least one processor and a memory. The memory stores a computer instruction capable of running on the processor, and the instruction is executed by the processor to implement the following steps. At step of S1, in response to an abnormality of a distributed storage, the number of abnormal data blocks and the number of abnormal check blocks are determined to judge whether there is a check block that needs to be recovered. At step of S2, in response to that there is the check block that needs to be recovered, a disk array is constructed by using normal data blocks and normal check blocks, a first reference matrix is constructed by using coding matrix rows corresponding to the normal data blocks and the normal check blocks, and the first reference matrix is converted into an inverse matrix through Gaussian elimination. At step of S3, coding matrix rows corresponding to a predetermined quantity of blocks are randomly selected from the normal data blocks and the normal check blocks, and a second reference matrix is constructed by using the coding matrix rows, the abnormal data blocks, and the abnormal check blocks. At step of S4, the inverse matrix and the second reference matrix are multiplied to obtain a first matrix, the first matrix and the disk array are multiplied to obtain an output matrix, and original data of the abnormal data blocks and original data of the abnormal check blocks are obtained according to the output matrix.

In some embodiments, the method further includes the following steps: in response to that there is no check block that needs to be recovered, the disk array is constructed by using the normal data blocks and the normal check blocks, the first reference matrix is constructed by using coding matrix rows corresponding to the normal data blocks and the normal check blocks, and the first reference matrix is converted into the inverse matrix through Gaussian elimination; and the inverse matrix and the disk array are multiplied to obtain the second output matrix, and original data of the abnormal data blocks is obtained according to the second output matrix.

In some embodiments, the step that the number of the abnormal data blocks and the number of the abnormal check blocks are determined to judge whether there is the check block that needs to be recovered includes that: whether a sum of the abnormal data blocks and the abnormal check blocks is less than a first threshold value is judged; and in response to that the sum of the abnormal data blocks and the abnormal check blocks is less than the first threshold value, the number of the abnormal data blocks and the number of the abnormal check blocks are separately determined.

In some embodiments, the operation that the coding matrix rows corresponding to the predetermined quantity of blocks are randomly selected from the normal data blocks and the normal check blocks includes that: the predetermined quantity is determined according to a difference value between the first threshold value and the sum.

Figure 4:
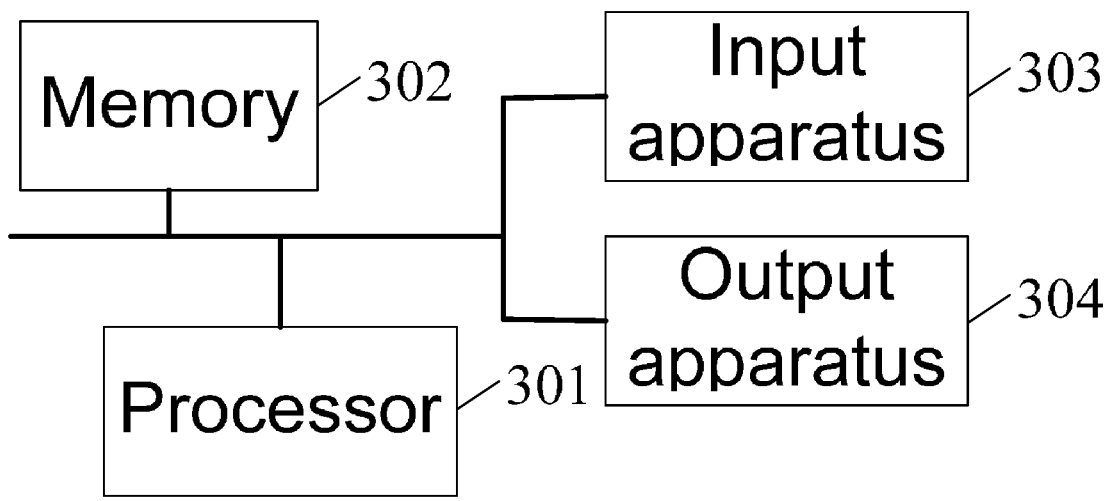
FIG. 4 illustrates a schematic diagram of hardware of an embodiment of a computer apparatus for performing check recovery based on Gaussian elimination provided by the present disclosure.

FIG. 4 illustrates a schematic diagram of hardware of one embodiment of a computer apparatus for performing check recovery based on Gaussian elimination provided by the present disclosure.

Taking an apparatus as shown in FIG. 4 as an example, the apparatus includes one processor 301 and one memory 302, and may further include an input apparatus 303 and an output apparatus 304.

The processor 301, the memory 302, the input apparatus 303, and the output apparatus 304 may be connected by a bus or other means, as exemplified by a bus connection in FIG. 4.

The memory 302, as a non-volatile computer-readable storage medium, may be configured to store non-volatile software programs, non-volatile computer-executable programs, and modules, such as the program instruction/module corresponding to the method for performing check recovery based on Gaussian elimination in the embodiments of the present disclosure. The processor 301 executes the non-volatile software programs, instructions, and modules stored in the memory 302 to execute various functional disclosures of a server and data processing, that is, to implement the method for performing check recovery based on Gaussian elimination in the abovementioned method embodiment.

The memory 302 may include a program storage area and a data storage area. The program storage area may store an operating system and an disclosure required for at least one function; and the data storage area may store data created according to usage of the method for performing check recovery based on Gaussian elimination and the like. In addition, the memory 302 may include a high-speed RAM, and may further include a non-volatile memory such as a disk storage apparatus, a flash apparatus, or other non-volatile solid storage apparatus. In some embodiments, the memory 302 may optionally include memories remotely located relative to the processor 301. These remote memories may be connected to local modules through a network. The examples of the abovementioned network include, but are not limited to, the Internet, the Intranet, a local area network, a mobile communication network, or combinations thereof.

The input apparatus 303 may receive input information, such as a user name and a password. The output apparatus 304 may include a display apparatus such as a display screen.

One or more program instructions/modules corresponding to the method for performing check recovery based on Gaussian elimination are stored in the memory 302. The method for performing check recovery based on Gaussian elimination in the any method embodiment mentioned above is performed when the program instructions/modules are executed by the processor 301.

Any one of the embodiments of the computer apparatus that implements the above method for performing check recovery based on Gaussian elimination may achieve the same or similar effects as any of the foregoing method embodiment corresponding thereto.

The present disclosure further provides a computer-readable storage medium. The computer-readable storage medium stores a computer program that performs the above-mentioned method when being executed by a processor.

It is finally to be noted that, those skilled in the art may understand that all or part of the processes in the above-mentioned method embodiments may be implemented by a computer program to instruct related hardware, and the program may be stored in a computer-readable storage medium. A program of the method for performing check recovery based on Gaussian elimination is stored in a computer-readable storage medium. When the program is executed, the flow of the embodiments of various methods above may be included. The storage medium of the program may be a disk, an optical disk, a Read Only Storage Memory (ROM), or a Random Access Memory (RAM). The above-mentioned embodiment of the computer program may achieve the same or similar effects as any foregoing method embodiment corresponding thereto.

The above are exemplary embodiments of the present disclosure, but it should be noted that, various changes and modifications may be made without departing from the scope disclosed in the embodiments of the present disclosure as defined in the claims. The functions, steps, and/or actions of the method claims in accordance with the disclosed embodiments described herein need not be performed in any particular order. In addition, although elements disclosed in the embodiments of the present disclosure may be described or claimed in the singular, unless explicitly limited to the singular, the plural may also be construed.

It is to be understood that, as used herein, the singular form "a" is intended to include the plural form as well, unless the context clearly supports an exception. It is also be understood that, "and/or" as used herein is meant to include any and all possible combinations of one or more of the associated listed items.

The serial numbers of the foregoing embodiments of the present disclosure are merely for description, and do not represent the superiority or inferiority of the embodiments.

Those of ordinary skill in the art should understand that all or part steps of the above embodiments may be completed by hardware, or may be completed by a program to instruct related hardware. The program may be stored in a computer-readable storage medium. The storage medium mentioned above may be a read-only memory, a disk, an optical disk, or the like.

Those of ordinary skill in the art should understand that, the discussion of any of the above embodiments is merely exemplary, and is not intended to imply that the scope (including the claims) disclosed in the embodiments of the present disclosure is limited to these examples. Under the idea of the embodiments of the present disclosure, the technical features in the above embodiments or different embodiments can also be combined. In addition, there are many other changes in different aspects of the above embodiments of the present disclosure, which are not provided in detail for the sake of brevity. Therefore, any omissions, modifications, equivalent replacements, improvements and the like made within the spirit and principle of the embodiments of the present disclosure shall all fall within the protection scope of the embodiments of the present disclosure.

What is claimed is:

1. A method for performing check recovery based on Gaussian elimination, comprising:
   in response to an abnormality of a distributed storage, determining a number of abnormal data blocks and a number of abnormal check blocks to judge whether there is a check block that needs to be recovered;
   in response to that there is the check block that needs to be recovered, constructing a disk array by using normal data blocks and normal check blocks, constructing a first reference matrix by using coding matrix rows corresponding to the normal data blocks and the normal check blocks, and converting the first reference matrix into an inverse matrix through Gaussian elimination;
   determining coding matrix rows corresponding to a predetermined quantity of blocks which are randomly selected from the normal data blocks and the normal check blocks, and constructing a second reference matrix by using the coding matrix rows corresponding to the predetermined quantity of blocks which are randomly selected, the abnormal data blocks, and the abnormal check blocks; and
   multiplying the inverse matrix and the second reference matrix to obtain a first matrix, multiplying the first matrix and the disk array to obtain an output matrix, and obtaining original data of the abnormal data blocks and original data of the abnormal check blocks according to the output matrix.

2. The method as claimed in claim 1, further comprising:
   in response to that there is no check block that needs to be recovered, constructing the disk array by using the normal data blocks and the normal check blocks, constructing the first reference matrix by using coding matrix rows corresponding to the normal data blocks and the normal check blocks, and converting the first reference matrix into the inverse matrix through Gaussian elimination; and
   multiplying the inverse matrix and the disk array to obtain a second output matrix, and obtaining original data of the abnormal data blocks according to the second output matrix.

3. The method as claimed in claim 1, wherein the determining the number of abnormal data blocks and the number of abnormal check blocks to judge whether there is the check block that needs to be recovered comprises:
   judging whether a sum of the abnormal data blocks and the abnormal check blocks is less than a first threshold value; and
   in response to that the sum of the abnormal data blocks and the abnormal check blocks is less than the first threshold value, separately determining the number of the abnormal data blocks and the number of the abnormal check blocks.

4. The method as claimed in claim 3, wherein the randomly selecting, from the normal data blocks and the normal check blocks, coding matrix rows corresponding to the predetermined quantity of blocks comprises:
  determining the predetermined quantity according to a difference value between the first threshold value and the sum.

5. The method as claimed in claim 1, wherein constructing the disk array by using normal data blocks and normal check blocks comprising:
  determining disks corresponding to the normal data blocks
  and determining disks corresponding to the normal check blocks; and
  constructing the disk array by using the disks corresponding to the normal data blocks and the disks corresponding to the normal check blocks.

6. The method as claimed in claim 5, wherein determining the disks corresponding to the normal data blocks and determining the disks corresponding to the normal check blocks comprising:
  selecting the normal data block and the normal check blocks; and
  reading the disks corresponding to the normal data blocks and the disks corresponding to the normal check blocks to calculating, so that the disk array is constructed.

7. The method as claimed in claim 1, wherein constructing the first reference matrix by using the coding matrix rows corresponding to the normal data blocks and the normal check blocks comprising:
  obtaining a coding matrix corresponding to data blocks and check blocks;
  reading the coding matrix rows corresponding to the normal data blocks and the normal check blocks through the coding matrix; and
  constructing the first reference matrix by using coding matrix rows corresponding to the normal data blocks and the normal check blocks.

8. The method as claimed in claim 1, wherein converting the first reference matrix into the inverse matrix through Gaussian elimination comprising:
  performing elementary row transformation on the first reference matrix to obtain the inverse matrix.

9. The method as claimed in claim 8, wherein performing elementary row transformation on the first reference matrix to obtain the inverse matrix comprising:
  multiplying or dividing the rows of the first reference matrix by a preset value;
  exchanging a position between the rows of the first reference matrix; and
  adding or subtracting the rows of the first reference matrix to obtain the inverse matrix.

10. A computer apparatus, comprising:
  at least one processor and a memory,
  wherein the memory stores a computer instruction capable of running on the processor, the computer instruction when executed by a processor, cause the processor to:
    in response to an abnormality of a distributed storage, determine a number of abnormal data blocks and a number of abnormal check blocks to judge whether there is a check block that needs to be recovered;
    in response to that there is the check block that needs to be recovered, construct a disk array by using normal data blocks and normal check blocks, construct a first reference matrix by using coding matrix rows corresponding to the normal data blocks and the normal check blocks, and convert the first reference matrix into an inverse matrix through Gaussian elimination;
    determine coding matrix rows corresponding to a predetermined quantity of blocks which are randomly selected from the normal data blocks and the normal check blocks, and construct a second reference matrix by using the coding matrix rows corresponding to the predetermined quantity of blocks which are randomly selected, the abnormal data blocks, and the abnormal check blocks; and
    multiply the inverse matrix and the second reference matrix to obtain a first matrix, multiply the first matrix and the disk array to obtain an output matrix, and obtain original data of the abnormal data blocks and original data of the abnormal check blocks according to the output matrix.

11. The computer apparatus as claimed in claim 10, wherein the computer instruction when executed by the processor, cause the processor to:
  in response to that there is no check block that needs to be recovered, construct the disk array by using the normal data blocks and the normal check blocks, construct the first reference matrix by using coding matrix rows corresponding to the normal data blocks and the normal check blocks, and convert the first reference matrix into the inverse matrix through Gaussian elimination; and
  multiply the inverse matrix and the disk array to obtain a second output matrix, and
  obtain original data of the abnormal data blocks according to the second output matrix.

12. The computer apparatus as claimed in claim 10, wherein the computer instruction when executed by the processor, cause the processor to:
  judge whether a sum of the abnormal data blocks and the abnormal check blocks is less than a first threshold value; and
  in response to that the sum of the abnormal data blocks and the abnormal check blocks is less than the first threshold value, separately determine the number of the abnormal data blocks and the number of the abnormal check blocks.

13. The computer apparatus as claimed in claim 10, wherein the computer instruction when executed by the processor, cause the processor to:
  determine the predetermined quantity according to a difference value between a first threshold value and a sum.

14. The computer apparatus as claimed in claim 10, wherein the computer instruction when executed by the processor, cause the processor to:
  determine disks corresponding to the normal data blocks and determining disks corresponding to the normal check blocks; and
  construct the disk array by using the disks corresponding to the normal data blocks and the disks corresponding to the normal check blocks.

15. The computer apparatus as claimed in claim 14, wherein the computer instruction when executed by the processor, cause the processor to:
  select the normal data block and the normal check blocks; and
  read the disks corresponding to the normal data blocks and the disks corresponding to the normal check blocks to calculating, so that the disk array is constructed.

16. The computer apparatus as claimed in claim 10, wherein the computer instruction when executed by the processor, cause the processor to:
- obtain a coding matrix corresponding to data blocks and check blocks;
- read the coding matrix rows corresponding to the normal data blocks and the normal check blocks through the coding matrix; and
- construct the first reference matrix by using coding matrix rows corresponding to the normal data blocks and the normal check blocks.

17. The computer apparatus as claimed in claim 10, wherein the computer instruction when executed by the processor, cause the processor to:
- perform elementary row transformation on the first reference matrix to obtain the inverse matrix.

18. The computer apparatus as claimed in claim 17, wherein the computer instruction when executed by the processor, cause the processor to:
- multiply or dividing the rows of the first reference matrix by a preset value;
- exchange a position between the rows of the first reference matrix; and
- add or subtract the rows of the first reference matrix to obtain the inverse matrix.

19. A non-transitory computer-readable storage medium, storing a computer program, wherein the computer program when executed by a processor, cause the processor to:
- in response to an abnormality of a distributed storage, determine a number of abnormal data blocks and a number of abnormal check blocks to judge whether there is a check block that needs to be recovered;
- in response to that there is the check block that needs to be recovered, construct a disk array by using normal data blocks and normal check blocks, construct a first reference matrix by using coding matrix rows corresponding to the normal data blocks and the normal check blocks, and convert the first reference matrix into an inverse matrix through Gaussian elimination;
- determine coding matrix rows corresponding to a predetermined quantity of blocks which are randomly selected from the normal data blocks and the normal check blocks, and construct a second reference matrix by using the coding matrix rows corresponding to the predetermined quantity of block which are randomly selected, the abnormal data blocks, and the abnormal check blocks; and
- multiply the inverse matrix and the second reference matrix to obtain a first matrix, multiply the first matrix and the disk array to obtain an output matrix, and obtain original data of the abnormal data blocks and original data of the abnormal check blocks according to the output matrix.

20. The computer-readable storage medium as claimed in claim 19, wherein the computer program when executed by the processor, cause the processor to:
- in response to that there is no check block that needs to be recovered, construct the disk array by using the normal data blocks and the normal check blocks, construct the first reference matrix by using coding matrix rows corresponding to the normal data blocks and the normal check blocks, and convert the first reference matrix into the inverse matrix through Gaussian elimination; and
- multiply the inverse matrix and the disk array to obtain a second output matrix, and obtain original data of the abnormal data blocks according to the second output matrix.

* * * * *